Nov. 3, 1931.  R. D. MOBERLY  1,830,123
FERTILIZER DISTRIBUTING ATTACHMENT
Filed Jan. 6, 1931  5 Sheets-Sheet 1
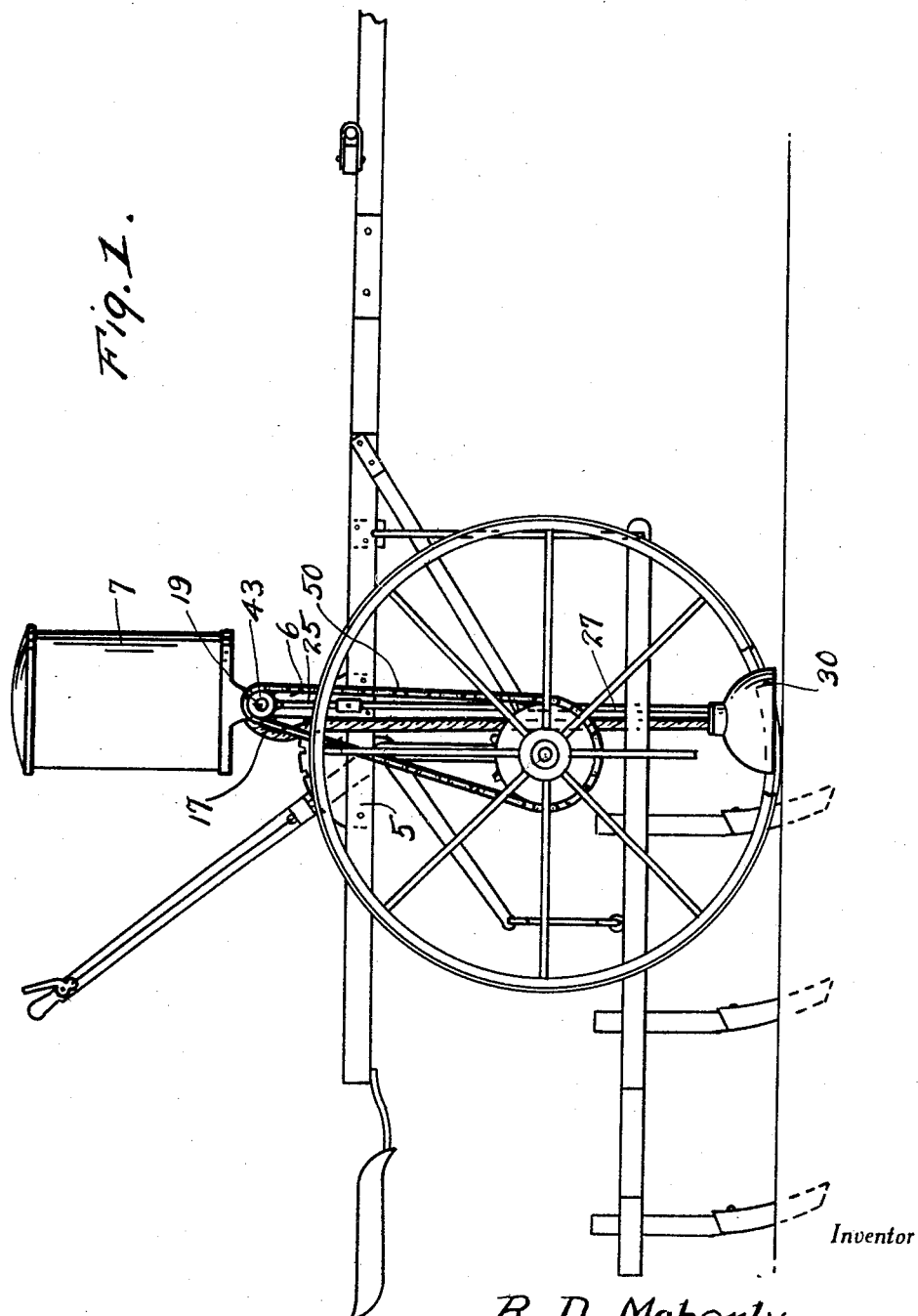
Inventor
R. D. Moberly
By Clarence A. O'Brien
Attorney

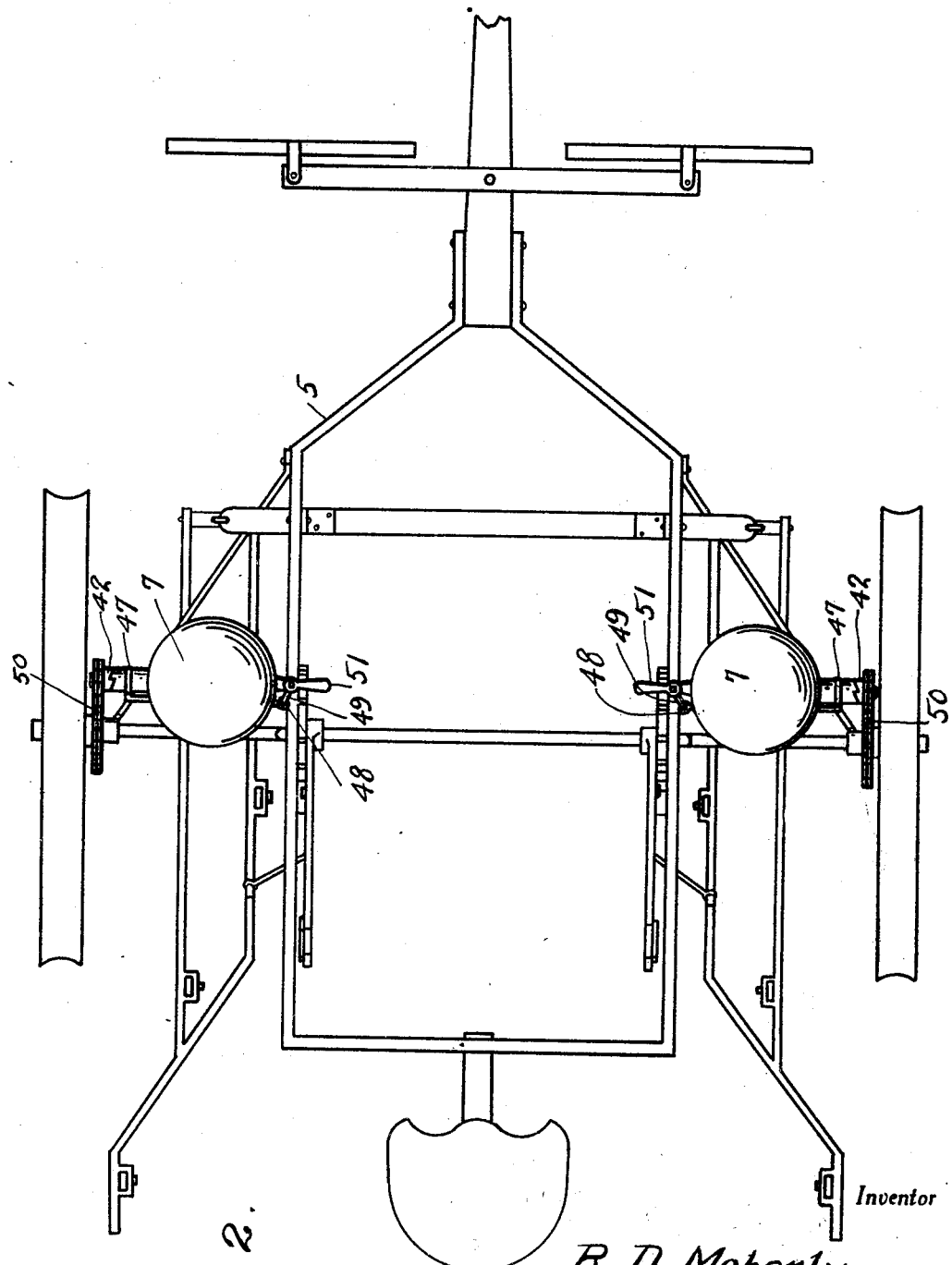

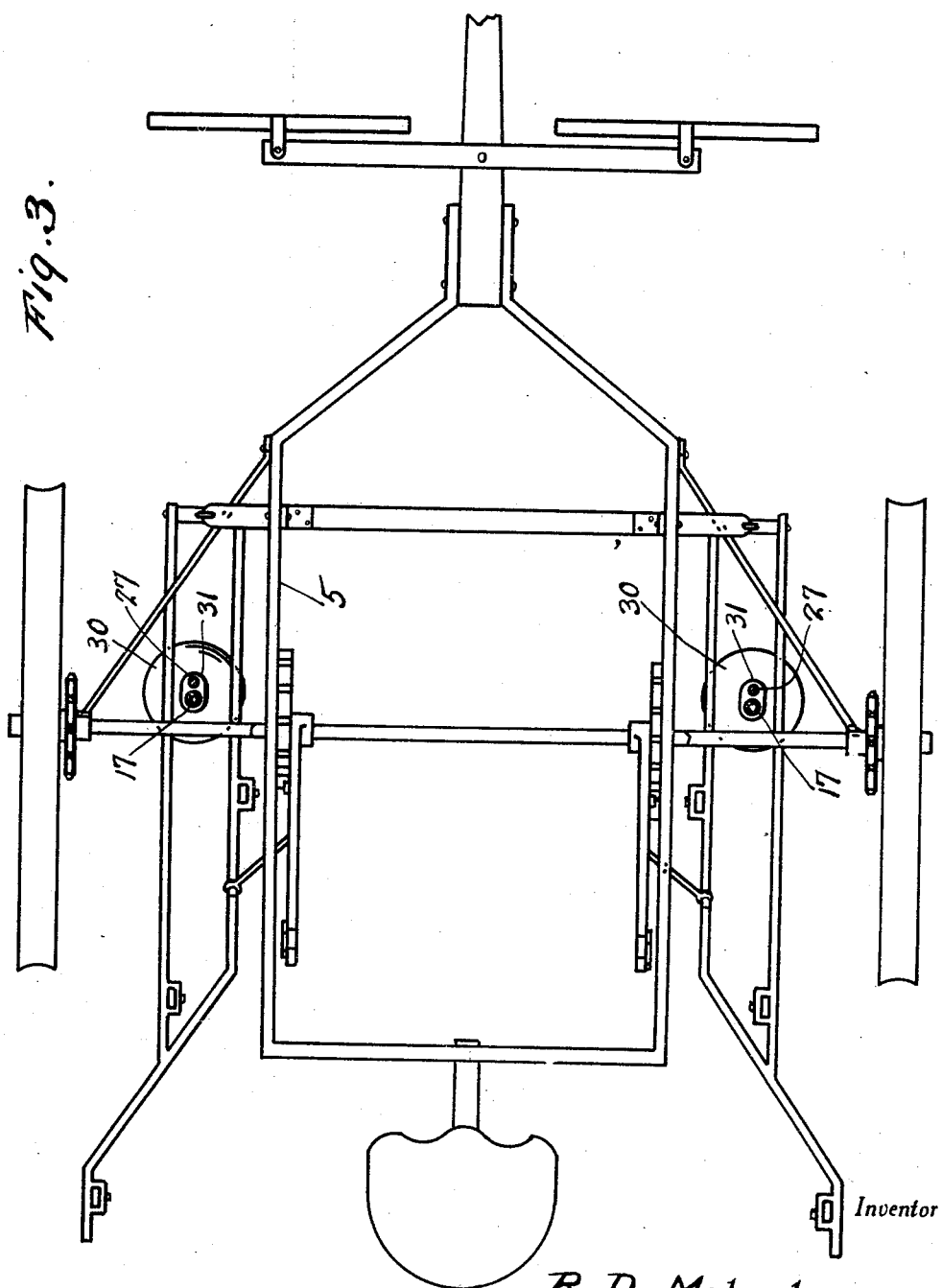

Nov. 3, 1931.  R. D. MOBERLY  1,830,123
FERTILIZER DISTRIBUTING ATTACHMENT
Filed Jan. 6, 1931  5 Sheets-Sheet 4
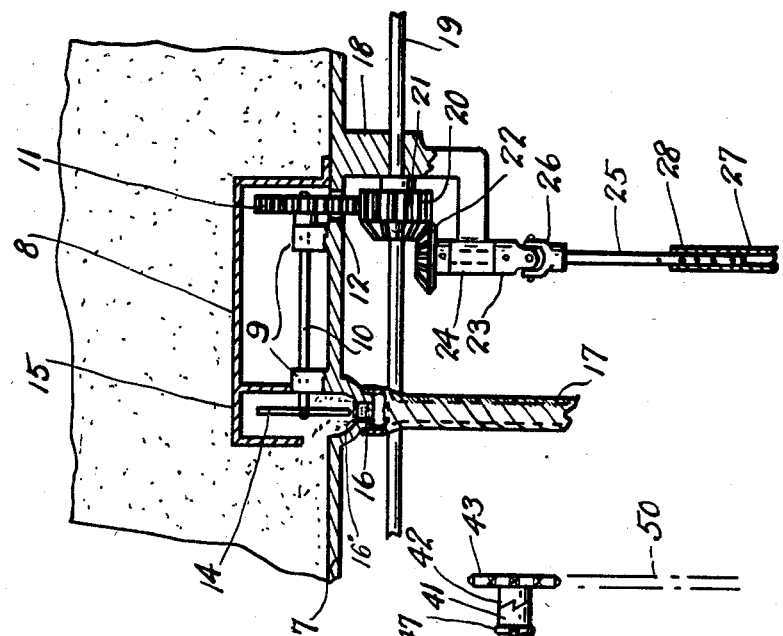
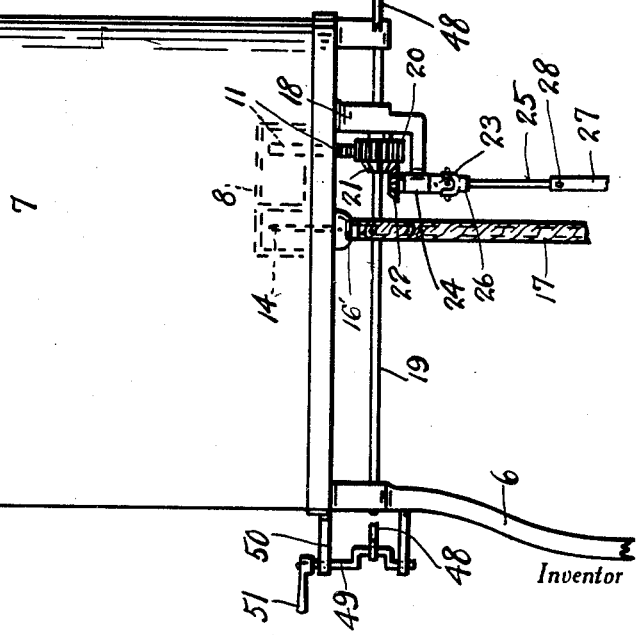
Inventor
R. D. Moberly
By Clarence A. O'Brien
Attorney

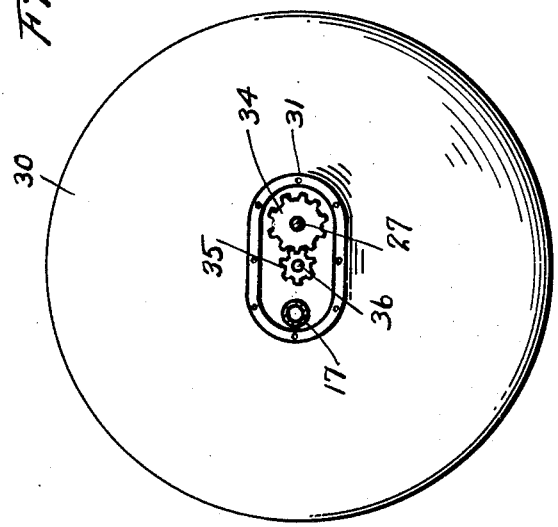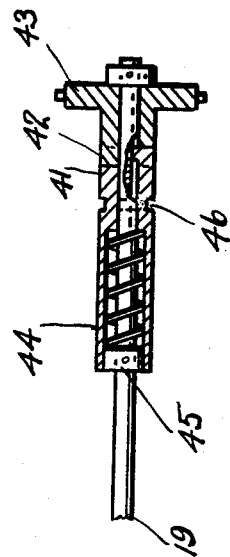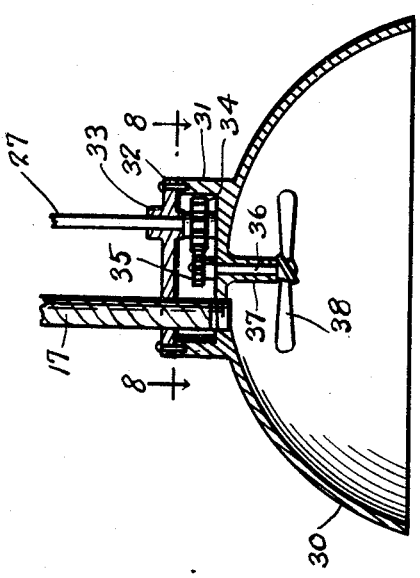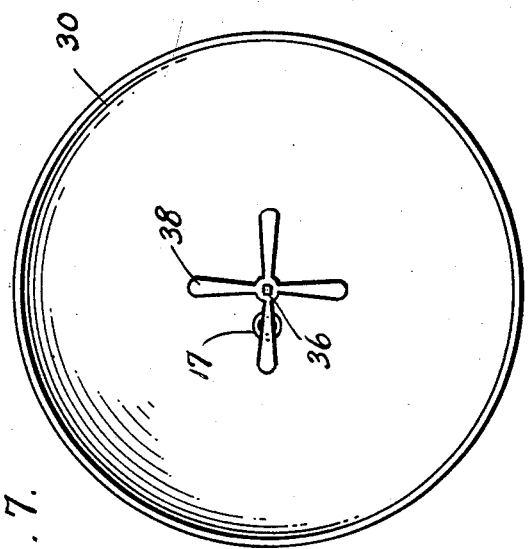

Patented Nov. 3, 1931

1,830,123

UNITED STATES PATENT OFFICE

ROLLIE D. MOBERLY, OF MOBERLY, MISSOURI

FERTILIZER DISTRIBUTING ATTACHMENT

Application filed January 6, 1931. Serial No. 506,953.

My present invention relates to an attachment particularly designed for use on cultivators and has for its prime object to provide means which may be operatively mounted on a cultivator to distribute fertilizer in front of the ground engaging elements of the cultivator to be mixed with the soil between row crops at the time of cultivation, the advantage being that the plant roots will gather nourishment from all points.

Another very important object of the invention resides in the provision of an attachment of this nature which is exceedingly simple in its construction, inexpensive to manufacture, easy to install, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a cultivator showing my attachment thereon,

Figure 2 is a top plan view thereof.

Figure 3 is a horizontal sectional view therethrough.

Figure 4 is an elevation of one of the hoppers.

Figure 5 is a sectional view through the lower end thereof.

Figure 6 is a sectional view through a hood.

Figure 7 is a bottom plan view thereof.

Figure 8 is a view taken substantially on the line 8—8 of Figure 6, and

Figure 9 is a sectional view showing the clutch construction.

Referring to the drawings in detail it will be seen that the numeral 5 denotes the frame of a conventional cultivator on which I have disclosed a mounting of the attachment embodying my invention by way of example. Suitable brackets 6 are attached to the frame 5 for supporting a fertilizer hopper or container 7 in the bottom of which is provided a casing 8 having bearings 9 therein in which is journaled a shaft 10. On one end of the shaft 10 is a gear 11 extending through an opening 12 in the bottom of the hopper. The shaft 10 extends through one end of the casing 8 and has a beater 14 thereon under a shield or hood 15 formed on the casing 8 above an opening 16 from which extends a conduit 17 for the fertilizer. Disposed over the opening 16 is a suitable valve 16' adapted to be regulated so as to permit predetermined amounts of fertilizer to be discharged therethrough. A bearing bracket 18 depends from the bottom of the hopper and has a shaft 19 journalled therein. A gear 20 is mounted on the shaft 19 in mesh with the gear 11 and has a bevel gear 21 formed thereon in mesh with the bevel gear 22 on a shaft 23 journalled in a bearing 24 at the lower end of the bearing bracket 18. A shaft section 25 has a universal joint connection 26 with the shaft 23. This section 25 is extended into a hollow shaft 27 and adjustably connected thereto as at 28. Although I have mainly referred to the hopper and associated parts in the singular it will be understood that the present exemplification of the invention there are two hoppers one at each side of the spring. At the lower end of each conduit or chute 17 there is a bell shaped hood 30 to which the bottom end of the conduit is engaged. A gear casing 31 is formed at the top of the hood 30 and has a detachable cover 32.

The conduit extends through an opening in the cover 32. Shaft section 27 is journalled in a bearing 33 in the cover and on its lower end has a gear 34 in the casing 31 in mesh with a gear 35 on a shaft 36 journalled in a bearing 37 formed at the top center of the hood 30 and on the bottom end of the shaft is a fan 38 for scattering and distributing the fertilizer gravitating down through the conduit.

On each shaft 19 there is splined a sleeve 40 having a clutch segment 41 engageable with clutch segment 42 formed integrally on sprocket 43. A spring 44 in the sleeve 40 impinges against an inner shoulder in the sleeve 40 and against a fixed collar 45 on the shaft 19 to hold the clutch segment normally in mesh. The sleeve 40 has an annular groove 46 with which is engaged a fork 47 on a rod 48 engaged with the crank of a crank shaft 49 journalled in bearings 50 and a lever 51 is mounted on the crank shaft 49 so that the same may be turned to pull the rod 48 and release the clutch segment 41 from the clutch segment 42.

Numeral 50 denotes the axle shaft of the cultivator which is operatively connected by chain and sprocket mechanism 51 with which is incorporated sprocket 43 heretobefore specifically referred to.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts as may be resorted to without departing from the spirit or scope of the invention as hereinafter claimed or sacrificing any of its advantages.

Having thus described my invention, what I claim as new is:

1. In an agricultural implement, a hopper supported thereon, a flexible tube depending from the hopper and in communication therewith, a bell-shaped hood connected to the lower end of the tube, a fan in the hood, a vertically arranged shaft having its lower end rotatably supported by the hood, gears connecting the lower end of the shaft with the fan, a stub shaft supported by the frame of the implement, a universal joint connecting the stub shaft with the upper end of the first-mentioned shaft, and means for rotating the stub shaft.

2. In an agricultural implement, a hopper supported by the frame thereof, a flexible tube depending from the hopper and in communication therewith, a bell-shaped hood at the lower end of the tube, a fan in the hood, a vertically arranged shaft having its lower end supported for rotary movement on the hood, gears connecting the lower end of the shaft with the fan, a stub shaft supported in the frame, universal joints connecting the stub shaft with the vertical shaft, an agitator in the hopper arranged above the upper end of the tube and means for rotating the stub shaft and the agitator.

3. In an agricultural implement, a hopper supported by the frame thereof, a flexible tube depending from the hopper and in communication therewith, a hood connected with the lower end of the tube, a fan in the hood, a vertically arranged shaft having its lower end rotatably supported by the hood, gears connecting the lower end of the shaft with the fan, a stub shaft supported by the frame of the implement, universal joints connecting the lower ends of the stub shaft with the vertical shaft, a drive shaft on the frame, gears connecting the drive shaft with the stub shaft, a housing in the lower part of the hopper having a hood part partly closing the communication to the flexible tube, an agitator in said part, a shaft connected with the agitator, a gear thereon, meshing with the gear on the drive shaft, and a housing on hood closing the gears which connect the lower end of the vertical shaft with the fan.

In testimony whereof I affix my signature.

ROLLIE D. MOBERLY.